Figure 1:
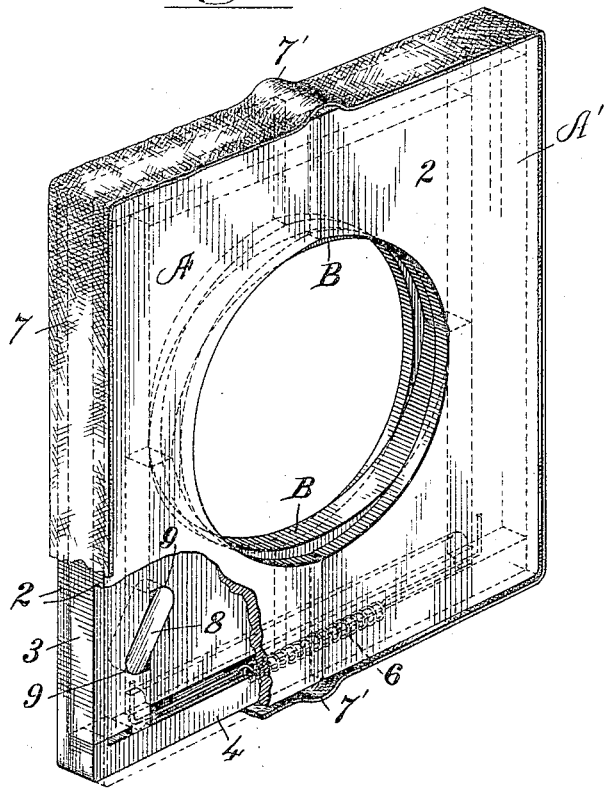

No. 808,292. PATENTED DEC. 26, 1905.
G. L. MANSFIELD.
JOURNAL BOX DUST GUARD.
APPLICATION FILED JULY 6, 1905.

2 SHEETS—SHEET 1.

Witnesses:

Inventor:-
George L. Mansfield

No. 808,292. PATENTED DEC. 26, 1905.
G. L. MANSFIELD.
JOURNAL BOX DUST GUARD.
APPLICATION FILED JULY 6, 1905.
2 SHEETS—SHEET 2.
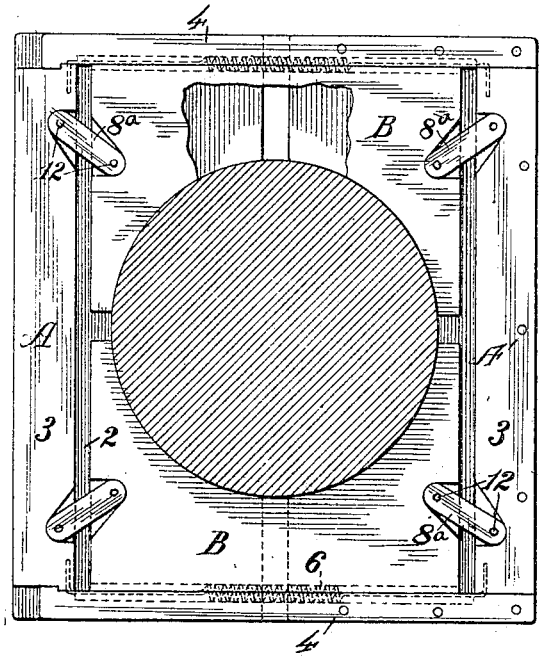
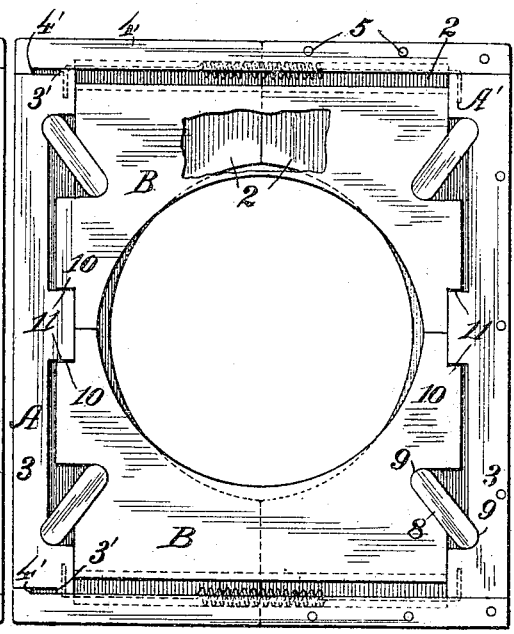
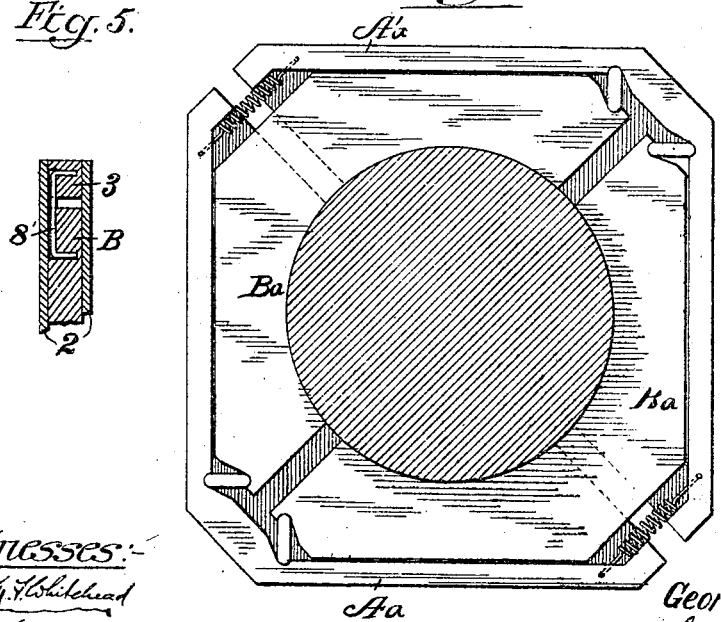
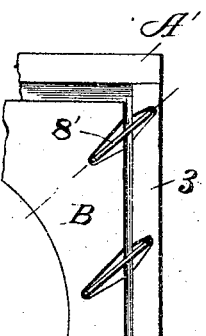
Witnesses:
Inventor:
George L. Mansfield

UNITED STATES PATENT OFFICE.

GEORGE L. MANSFIELD, OF CHICAGO, ILLINOIS.

JOURNAL-BOX DUST-GUARD.

No. 808,292.	Specification of Letters Patent.	Patented Dec. 26, 1905.

Application filed July 6, 1905. Serial No. 268,329.

*To all whom it may concern:*

Be it known that I, GEORGE L. MANSFIELD, a citizen of the United States, and a resident of Chicago, Cook county, Illinois, have invented a certain new, useful, and Improved Journal-Box Dust-Guard, of which the following is a full, clear, and exact description, such as will enable others skilled in the art to which it appertains to make and use the same.

My invention relates to dust-guards for journal-boxes. These devices are used to exclude dust from journal-boxes, the same occupying the opening in the inner end of the journal-box, through which the journal enters said box.

My invention has special reference to improvements in dust-guards of that class which, because adapted to take up their own wear, are known as "adjustable" dust-guards.

The object of my invention is to provide a substantially rectangular dust-guard containing a journal-opening and which shall be composed of sections adapted to press upon or about a car-axle journal.

The particular object of my invention is to provide a dust-guard of the class mentioned that shall be composed of two sets of transversely-related sections, so arranged that they may be readily expanded and placed upon a journal and will thereafter automatically contract about the journal to maintain a tight joint therewith at all times.

A further object of the invention is to provide improved means for connecting the transversely-related sections of a dust-guard with a view to providing a dust-guard wherein one set of sections shall when expanded be capable of moving the sections of the other set.

My invention consists generally in a dust-guard comprising, in combination, a plurality of incasing members suitably connected and constituting the body of the dust-guard, a plurality of other sections incased within the first-mentioned sections, the incasing and incased sections being movable transversely and together containing an axle-opening, and a plurality of struts or links movably connecting the incasing and incased sections and adapted to communicate the movement of the sections of one of the sets to the sections of the other set, whereby the expansion and contraction of the guard as a whole is facilitated and insured and whereby the several sections are adapted to bear upon a journal with uniform pressure; and, further, my invention consists in various details of construction and in combinations of parts, all as hereinafter described, and particularly pointed out in the claims.

My invention will be more readily understood by reference to the accompanying drawings, forming a part of this specification, and in which—

Figure 1 is a perspective view of a dust-guard embodying my invention. Fig. 2 is a side view of the dust-guard, like unto Fig. 1, but with the side plates of the incasing sections removed to disclose the incased sections. Fig. 3 is a similar view showing the dust-guard expanded upon a journal. Fig. 4 is a detail view illustrating a modification of the form of the links used to connect the incasing and incased sections of the guard. Fig. 5 is another detail view showing one of the links illustrated in Fig. 4, and Fig. 6 shows a guard of modified form wherein the sections are divided or separated upon a diagonal line.

As shown in the drawings, my dust-guard is preferably composed of four principal members, with minor parts associated with and connecting them. Two of the principal parts are the incasing sections A A', and the remaining two are the incased sections B B. I prefer that the incasing sections shall meet on a line parallel with their longer edges and that each section shall comprise two side plates 2 2 and a mid-strip 3. One of the incasing sections is further equipped with two guide-bars 4 4, secured thereto by nails 5 5 and extending across the top and bottom of the other incasing section between the side plates thereof. Obviously one of the bars may be attached to each section A A' instead of both being attached to one of said sections The arrangement is such that the sections A A' may be separated against the tension of the springs 6 6, which connect said sections, as shown in Figs. 1, 2, and 3. Suitable stops 4' and 3', provided upon or in the bars 4 and the section A, limit the outward movement of the sections A A', permitting such movement only to the extent required to admit a journal in the opening formed within the assembled sections. I prefer to completely inclose the guard by an edging 7, tacked or otherwise secured to the edges of the guard and having fullness 7' at top and bottom to permit the expansion of the guard. If desired, this edging may be relied upon to prevent undue separation of the sections A A', in which case the stops 3' 4' may be dispensed with. The edging 7 is made from a flexible fabric and is wider than the edge of the guard, and its office is to close the cracks between the sides of the guard and the walls of the dust-guard pocket in the journal-box wherein the guard is used. The sections B B extend transversely of the sections A A' and are arranged within the rectangular recess within the body of the guard—i. e., the sections A A'. As will be seen, these sections B extend across and close the openings existing between the meeting edges of the sections A A' when said sections are expanded, as shown in Fig. 3. Reciprocally the solid sides 2 of the sections A A' close the openings between the inner ends of the sections B B under like circumstances. To avoid duplicating the springs 6 by placing such springs upon the sections B B and also to avoid the annoyance that would attend the simultaneous manipulation of independently-connected sets of sections, I so construct my guard that the springs 6, which press the sections A A' together, also serve to close the sections B B. I prefer to carry out this feature of my invention by means of short links or pivotal struts 8, which I arrange between the ends of the sections B B and the mid-strip 3 of the sections A A'. These links may be of various forms. The most simple form is illustrated in Figs. 1 and 2, wherein the parts B and 3 are provided with small pockets 9 to receive the rounded ends of the links 8. The links normally—that is, when the sections are collapsed—occupy acute angled relation to the vertical edges of the guard, and being under tension of the springs, communicated through the sections A A', the four links (see Fig. 2) operate to force the sections B B together. At such times the openings within the pairs of sections are non-circular; but when outward pressure is exerted upon the inner peripheries of the sections B B and said sections are separated the links will operate to drive the incasing sections outward in a direction transverse to the movement of the sections B B, as represented in Fig. 3. The springs 6 6 exert tension upon all of the members of the guard thus connected by pivotal struts or links, and it is obvious that when the sections have been expanded or distended to admit a journal they will thereafter press firmly upon said journal and make a tight joint therewith, effectually excluding dust from the journal-box. When the guard is distended upon a journal, the links occupy angles of substantially forty-five degrees with relation to the meeting edges of the pairs of sections and in this condition will uniformly distribute the tension of the springs upon all of the sections, thus insuring uniform wear in the parts. The links of Fig. 2 abut the parts which they operatively connect, but are not otherwise pivotally connected therewith, and to prevent possible displacement of the sections B B within the sections A A' at times when the guard is not in service and when the sections A A' are arbitrarily drawn apart I provide the sections B B and A A' with stop-shoulders 10 and 11, upon which the sections B may fall or close when no longer supported by the links. I have not found this precaution of great importance, however, as the links themselves cannot escape from the pockets in the sections when the incasing sections are separated, and therefore prevent any such displacement or contortion of the sections as would render them inoperative. This seeming though not actual objection to the structure illustrated in Figs. 1 and 2 may be avoided and a distinct advantage gained by pivotally pinning the ends of the links upon the incasing and incased sections, as shown by $8^a$ in Fig. 3. In this instance the ends of the links $8^a$ are made to straddle portions of the parts B and 3 and are actually attached thereto by pins 12. The advantage gained in this construction is that the sections B will automatically respond to the separation of the sections A A', and vice versa, whereas in the case of Fig. 2 the sections A A' cannot operate to positively separate the sections B B and distend the opening between them. The same advantages attach to a guard wherein the wooden links or short blocks 8 are replaced by wire, staple-like links 8' having their legs or points driven into the sections B B and the mid-bars 3 of the outer sections, as shown in Figs. 4 and 5. The two kinds of links may be briefly differentiated by terming those of Fig. 2 as "links for pressure only" and those of Figs. 3, 4, and 5 as "pressure and tension links," the latter serving the dual office of struts and draft members.

Obviously this dust-guard, which is made of transversely-positioned sections, connected only by springs and pivotal links, may, so to speak, be divided upon any diameter. This I have exemplified in Fig. 6, wherein the incasing members are of triangular form and have diagonal meeting edges, the same design being carried out in the internal or incased members. In this case I dispense with the guides between the incasing members $A^a$, as the greater length of the incased members $B^a$ affords requisite rigidity without recourse to other guiding means. The principal figures of the drawings show the body of the guard divided upon a vertical line; but it should be understood that the guard, particularly as constructed in Fig. 3, may be divided upon a horizontal line, and thus positioned in the journal-box.

I am aware that in ordinary acceptance the term "link" conveys the meaning or sense of "connection;" but as the links and the link-like devices or pivotal struts (shown respectively, in Figs. 3, 4, and 5 and Figs. 1, 2, and 6) are substantial equivalents in form and in operation, and though the latter do not positively connect the parts, I have herein and shall in the claims use the word "link" to mean and define both—that is, either form of the link device.

Having thus described my invention, I claim as new and desire to secure by Letters Patent—

1. In a dust-guard, incasing members containing a journal-opening, in combination with incased members therein and provided with a corresponding journal-opening, means pressing said members toward a common center, and links angularly interposed between the incasing and incased members, substantially as described.

2. In a dust-guard, incasing members containing a journal-opening and guided one upon the other, in combination with members incased therein and having a corresponding journal-opening, means pressing said members toward a common center and permitting the expansion thereof, and means angularly and pivotally connecting each incased section with both incasing sections, substantially as and for the purpose specified.

3. In a dust-guard, a plurality of relatively distensible sections forming the body of the guard, and together containing a journal-opening, in combination with a second plurality of sections together containing a corresponding journal-opening, said second plurality of sections being arranged for movement transverse to the movement of the first-mentioned sections, links arranged to impart the movement of the sections of one set to those of the other set, and means pressing said sections toward a common center, substantially as described.

4. In a dust-guard, a pair of incasing sections, together containing a journal-opening, in combination with a pair of incased sections containing a corresponding opening and arranged at right angles to the incasing section, and swinging pressure-communicating devices interposed between the incasing and incased sections and adapted to communicate the movement of the incased sections to the incasing sections to separate the latter, substantially as described.

5. In a dust-guard, a pair of incasing sections containing a journal-opening, in combination with a pair of incased sections also containing a journal-opening and arranged at right angles to the incasing sections, and links arranged within said incasing sections and pivotally connecting the same with the incased sections for reciprocal movement, and suitable means pressing said sections toward a common center, substantially as described.

6. In a dust-guard, a pair of incasing sections and means pressing the same together, in combination with other sections incased by the first-mentioned sections, said sections together containing a journal-opening, and links pivoted upon the ends of the incased sections and upon the adjacent portions of the incasing sections, respectively and thereby adapted to communicate the movement of either pair of sections to the other pair, substantially as described.

7. In a dust-guard, incasing sections, containing a journal-opening and each comprising side plates and a mid-bar, in combination with means whereby said sections are movably alined, incased sections arranged between the sides of the incasing sections, at right angles to said incasing sections and containing a journal-opening, springs connecting the incasing sections and links angularly positioned between said mid-strips and the incased sections and pivotally connecting the sections, substantially as described.

8. In a dust-guard, a pair of incasing sections containing a journal-opening, in combination with incased sections, and interoperating devices occupying angular positions between said incasing and said incased sections and adapted to communicate the movement of one pair of sections to the other pair, substantially as described.

9. A dust-guard comprising a plurality of relatively distensible sections together containing a normally non-circular opening, means pressing said members toward a common center and permitting extension thereof and angularly-disposed links interposed between said sections whereby the outer movement of either pair thereof is communicated to the other sections, substantially as described.

In testimony whereof I have hereunto set my hand, this 1st day of July, 1905, in the presence of two subscribing witnesses.

GEORGE L. MANSFIELD.

Witnesses:
CHARLES GILBERT HAWLEY,
HOWARD S. AUSTIN.